(12) United States Patent
Fernando et al.

(10) Patent No.: US 8,404,187 B1
(45) Date of Patent: Mar. 26, 2013

(54) SUPPORT ELEMENT FOR FRAGILE STRUCTURES SUCH AS CATALYTIC CONVERTERS

(75) Inventors: Joseph A. Fernando, Amherst, NY (US); John D. Teneyck, Lewiston, NY (US); Thomas S. Lacki, Alden, NY (US)

(73) Assignee: Unifrax I LLC, Niagara Falls, NY (US)

( * ) Notice: Subject to any disclaimer, the term of this patent is extended or adjusted under 35 U.S.C. 154(b) by 802 days.

(21) Appl. No.: 09/560,469

(22) Filed: Apr. 28, 2000

Related U.S. Application Data

(63) Continuation-in-part of application No. 09/038,243, filed on Mar. 11, 1998, now abandoned.

(51) Int. Cl.
| | |
|---|---|
| F01N 3/08 | (2006.01) |
| F01N 13/14 | (2010.01) |
| F01N 13/16 | (2010.01) |
| B01D 53/92 | (2006.01) |

(52) U.S. Cl. ........................................ 422/179
(58) Field of Classification Search ................. 422/177, 422/179, 180, 221, 222, 168; 428/920, 921; 501/95.01, 95.02, 95.1; 55/DIG. 30, 523
See application file for complete search history.

(56) References Cited

U.S. PATENT DOCUMENTS
3,189,418 A 6/1965 Gary
(Continued)

FOREIGN PATENT DOCUMENTS
| | | |
|---|---|---|
| CA | 1037973 | 9/1978 |
| EP | 0 007 485 A1 | 2/1980 |

(Continued)

OTHER PUBLICATIONS
Gulati, Ten Eyck and Lebold. "Durable Packaging Design for Cordierite Ceramic Catalysts for Motorcycle Application," Society of Automotive Engineers Meeting, Detroit, Michigan, Mar. 1, 1993.

(Continued)

*Primary Examiner* — Jennifer A Leung
(74) *Attorney, Agent, or Firm* — Curatolo Sidoti Co., LPA; Joseph G. Curatolo; Salvatore A. Sidoti

(57) ABSTRACT

A support element is disposed between a housing and a fragile structure resiliently mounted within the housing. The support element includes an integral, substantially non-expanding ply or layer of melt-formed ceramic fibers containing at least alumina and silica. The fibers have an average diameter ranging from about 1 micron to about 14 microns and have been prepared by a process of heat treating under a time-temperature regimen of one of (i) heat treating said fibers at a temperature of 990° C. to at least 1050° C. for greater than 1 hour such that the treated fibers have about 5 to about 50 percent crystallinity as detected by x-ray diffraction, and a crystallite size of about 50 Å to about 500 Å, or (ii) heat treating said fibers at a temperature of greater than 1050° C. for an effective time such that the treated fibers have about 5 to about 50 percent crystallinity as detected by x-ray diffraction, and a crystallite size of about 50 Å to about 500 Å. The resultant support element provides a minimum residual pressure for holding the fragile structure within the housing of one of at least 4 psi after at least 200 cycles of testing at 900° C. or at least 10 psi after at least 1000 cycles of testing at 750° C. Such a support element may be used in devices for the treatment of exhaust gases such as catalytic converters, diesel particulate traps and the like. A method of mounting a fragile structure in such a device is also provided.

38 Claims, 8 Drawing Sheets

U.S. PATENT DOCUMENTS

| | | | |
|---|---|---|---|
| 3,227,241 A | 1/1966 | Mattoon | |
| 3,458,329 A | 7/1969 | Owens et al. | 106/39 |
| 3,771,967 A | 11/1973 | Nowak | 422/179 |
| 3,795,524 A | 3/1974 | Sowman | 106/65 |
| 3,798,006 A | 3/1974 | Balluff | |
| 3,876,384 A | 4/1975 | Santiago et al. | 422/179 |
| 3,891,396 A | 6/1975 | Musall | |
| 3,916,057 A | 10/1975 | Hatch et al. | 428/236 |
| 3,996,145 A | 12/1976 | Hepburn | 252/62 |
| 4,087,039 A | 5/1978 | Balluff | |
| 4,101,280 A | 7/1978 | Frietzsche et al. | |
| 4,142,864 A | 3/1979 | Rosynsky | |
| 4,144,195 A | 3/1979 | Siebels | |
| 4,159,205 A | 6/1979 | Miyahara et al. | 106/73.4 |
| 4,240,833 A | 12/1980 | Myles | |
| 4,269,807 A | 5/1981 | Bailey | |
| 4,277,269 A | 7/1981 | Sweeting | 65/2 |
| 4,305,992 A | 12/1981 | Langer | |
| 4,312,911 A | 1/1982 | Smith | |
| 4,327,145 A | 4/1982 | Mitani et al. | 428/290 |
| 4,559,862 A | 12/1985 | Case et al. | 87/1 |
| 4,617,176 A | 10/1986 | Merry | |
| 4,693,338 A | 9/1987 | Clerc | 181/231 |
| 4,735,757 A | 4/1988 | Yamamoto et al. | 264/119 |
| 4,752,515 A | 6/1988 | Hosoi et al. | 428/114 |
| 4,863,700 A | 9/1989 | Ten Eyck | 422/179 |
| 4,865,818 A | 9/1989 | Merry et al. | 422/179 |
| 4,929,429 A | 5/1990 | Merry | 422/179 |
| 4,999,168 A | 3/1991 | Ten Eyck | |
| 5,008,086 A | 4/1991 | Merry | |
| 5,028,397 A | 7/1991 | Merry | 422/179 |
| 5,032,441 A | 7/1991 | Ten Eyck et al. | 428/77 |
| 5,089,207 A | 2/1992 | Hammond et al. | |
| 5,145,811 A | 9/1992 | Lintz et al. | 501/95 |
| 5,250,269 A | 10/1993 | Langer | 422/179 |
| 5,290,522 A | 3/1994 | Rogers et al. | 422/179 |
| 5,326,633 A | 7/1994 | Clough et al. | 428/288 |
| 5,376,341 A | 12/1994 | Gulati | 422/179 |
| 5,380,580 A | 1/1995 | Rogers et al. | 428/219 |
| 5,523,059 A | 6/1996 | Langer | 422/179 |
| 5,580,532 A | 12/1996 | Robinson et al. | 422/179 |
| 5,666,726 A | 9/1997 | Robinson et al. | 29/890 |

FOREIGN PATENT DOCUMENTS

| | | |
|---|---|---|
| EP | 0 205 704 | 12/1986 |
| EP | 0 319 299 | 6/1989 |
| EP | 0 328 293 | 8/1989 |
| GB | 1481133 | 7/1977 |
| GB | 1513808 | 6/1978 |
| JP | 04-083773 | 3/1992 |
| JP | 7-286514 A | 10/1995 |

OTHER PUBLICATIONS

Maret, Gulati, Lambert and Zink. "Systems Durability of a Ceramic Racetrack Converter," International Fuels and Lubricants Meeting, Toronto, Canada, Oct. 7-10, 1991.

SUPPORT ELEMENT FOR FRAGILE STRUCTURES SUCH AS CATALYTIC CONVERTERS

CROSS REFERENCE TO RELATED APPLICATIONS

The present application is a continuation-in-part of U.S. Ser. No. 09/038,243, filed on Mar. 11, 1998, now abandoned.

FIELD OF THE INVENTION

The present invention is directed to catalytic converters, diesel particulate traps and other devices for the treatment of exhaust gases. More particularly, the present invention is directed to a device having a fragile structure mounted within a housing which is supported therein by a support element disposed between the housing and the fragile structure. The support element has improved resilience and handling properties as well as increased support pressure characteristics and comprises an integral, substantially nonexpanding ply or layer of melt-formed ceramic fibers for mounting and supporting the fragile structure. The improved characteristics of the non-intumescent support element are a result of controlled mullite microcrystal formation in the melt-formed ceramic fiber via heat treatment under different time-temperature regimens.

BACKGROUND OF THE INVENTION

Catalytic converter assemblies for treating exhaust gases of automotive and diesel engines contain a fragile structure, such as a catalyst support structure, for holding the catalyst, used to effect the oxidation of carbon monoxide and hydrocarbons and the reduction of oxides of nitrogen, the fragile structure being mounted within a metal housing. The fragile structure is preferably made of a frangible material, such as a monolithic structure formed of metal or a brittle, fireproof ceramic material such as aluminum oxide, silicon dioxide, magnesium oxide, zirconia, cordierite, silicon carbide and the like. These materials provide a skeleton type of structure with a plurality of tiny flow channels. However, as noted hereinabove, these structures can be, and oftentimes are, very fragile. In fact, these monolithic structures can be so fragile that small shockloads or stresses are often sufficient to crack or crush them.

The fragile structure is contained within a metal housing, with a space or gap between the external surface of the fragile structure and the internal surface of the housing. In order to protect the fragile structure from thermal and mechanical shock and other stresses noted above, as well as to provide thermal insulation, it is known to position at least one ply or layer of mounting or support material within the gap between the fragile structure and the housing. For example, assignee's U.S. Pat. Nos. 4,863,700, 4,999,168, 5,032,441, and 5,580,532, the disclosure of each of which is incorporated herein by reference, disclose catalytic converter devices having a mounting or support material disposed within the gap between the housing and the fragile structure contained in the devices to protect the fragile structure and otherwise hold it in place within the housing.

However, even some of the latest mounting materials used in these catalytic converter devices, while suitable for most current automotive catalytic converters, do not entirely satisfy all design requirements of the fragile structure and catalytic converter manufacturers. In particular, the residual holding pressure exerted by many of the state-of-the-art plies of support material, often referred to as mounting mats, have been found to be inadequate at times where the catalytic converter has undergone wide temperature fluctuations, thereby causing significant expansion and contraction of the metal housing in relation to the fragile structure, also referred to as the catalyst support structure, which, in turn, causes significant compression and expansion cycles for the mounting mats over a period of time. It has been found that these state-of-the-art mounting mats do not sufficiently hold the fragile structure in the most severe of applications where temperatures reach well above 900° C., and often undergo constant thermal cycling. Vibration and mechanical shock are further problems for the mounting mats.

These problems are even further amplified in catalytic converter systems having catalytic support structures greater than 35 mm in diameter because a larger structure implies a larger outer housing, which, in turn, implies a larger gap expansion between the fragile support structure and housing at elevated temperatures due to the larger thermal expansion of the housing with respect to the fragile support structure. Under normal operating conditions, a minimum effective holding pressure for the support element or mat of approximately 2 psi is sufficient to prevent the fragile structure from being dislodged and damaged. The effective mat holding pressure is defined as the mat holding pressure multiplied by the coefficient of friction of the mat/fragile structure interface. The coefficient of friction of typical mat products is approximately 0.45 in the in-use condition. The mounting mat, therefore, is required to have a sufficient residual minimum holding pressure after 200 cycles of testing at a nominal temperature of 900° C. of at least 4 psi, and after 1000 cycles of testing at a nominal temperature of 900° C. of at least 4 psi. More preferably, the support element (i.e., mounting mat) should have a minimum holding pressure after 200 cycles of testing at the nominal 900° C. temperature of at least 10 psi. When tested after 1000 cycles at 900° C., the support mat should more preferably have a minimum holding pressure of at least 6 psi, and even more preferably, at least 12 psi. Still further, the support element should exhibit predictable and acceptable degradation with high temperature exposure and mechanical cycling, meaning the ply or plies should preferably exhibit a regular pattern of degradation of no more than about 1 psi per 100 cycles after about 600 cycles.

Most of the mounting mats, heretofore, have attempted to overcome the degradation and thermal cycling problems by using extremely expensive, high alumina refractory ceramic fibers which add significantly to the cost of the production of the mounting mat. These refractory ceramic fibers are made from an aqueous solution or a colloidal dispersion that is called an "organosol" or a "sol gel". While ceramic fibers formed by sol gel processes may offer a high degree of resiliency needed for mounting monolithic structures, their high cost have forced manufacturers to seek other, less expensive solutions.

For instance, some manufacturers of mounting or support mats have resorted to expensive preprocessing such as stitch binding prior to installation of the mat. In other instances, the mounting material used may be required to be used in combination with other mounting materials, such as intumescent sheets and backing layers, in order to provide sufficient strength for handleability and for resiliency. These mounting materials are generally very thick and lack the structural integrity necessary, and may even require being handled in a bag to prevent crumbling. The mounting materials are also difficult to cut to size for installation, and further must be compressed substantially to fit enough material needed for supportive mounting within the gap between the catalyst support structure and the housing. Consequently, "flashing" commonly occurs, with excess material being squeezed out of the housing.

As an alternative to using sol gel-derived, refractory ceramic fibers, attempts have been made to form the ceramic fibers using melt processing techniques. However, conventional melt-formed ceramic fibers typically contain shot, on the order of 30 to 60 percent, and have been deemed not suitable for the particular application of a mounting mat within a catalytic converter or other similar device. Although it is possible to treat the fibers to reduce the shot content to as low as 5 percent, at least some patents, such as U.S. Pat. Nos. 4,929,429, 5,028,397 and 5,250,269, have suggested that these treated fibers still lack the requisite resiliency and, therefore, are not capable of providing the necessary holding pressure at a nominal temperature of 900° C.

However, at least one patent has attempted to overcome these shortfalls with melt-formed refractory ceramic fibers. U.S. Pat. No. 5,250,269 teaches that a mounting mat may have the requisite resiliency values if it is produced using a particular annealing process to form substantially amorphous refractory ceramic fibers for the mat. By "substantially amorphous" is meant that no crystallinity can be detected by x-ray diffraction. In order to obtain this result, U.S. Pat. No. 5,250,269 specifies that annealing temperatures of at least 700° C. and less than 990° C. are required to achieve a substantially amorphous melt-formed ceramic fiber. It is suggested that the annealing process provides for suitable ceramic fibers having sufficient resiliency values, regardless of the amount of shot contained therein. The particular type of melt processed fibers employed, i.e., melt blown fibers or melt spun fibers, is not disclosed in U.S. Pat. No. 5,250,269.

In British Patent Specification No. 1,481,133, it is suggested that a blanket or sheet of amorphous ceramic fibers will retain a substantially permanent set under compression, but that good resiliency can be achieved by converting the fibers from an amorphous form to a fine-grained crystalline form having a crystalline size of less than 200 Å, after which the blanket will return to about 85 to 90% of its original configuration after compression. This can be achieved, according to the British specification, by heating the fibers to a temperature above the devitrification temperature of about 950° C., while avoiding higher temperatures above about 1050° C., since higher temperatures are recognized as forming course-grained structures which, according to the British specification, produces poor handling properties. The fibers are heated at the above-noted temperatures for a period of time sufficient to produce devitrification throughout the refractory ceramic fibers, but must be terminated prior to the onset of excessive grain growth. According to the British specification, such a time period may vary from 10 minutes to up to 1 hour.

Although the British specification characterizes the fibers as capable of returning to at least 85 to 90 percent of its original configuration when a compression force is released, the specification does not specify what applications are suitable for such a blanket or sheet of fibers, although mats and blankets of refractory ceramic fibers were commonly used in the 1970's as furnace liners. There is no mention whatsoever of the fibers being suitable for use in the mounting mats of catalytic converters.

The present invention seeks to use high index, crystallized, melt-formed ceramic fibers by heat treating them at temperatures above the mullite crystallization temperature of 980° C., and more preferably, at temperatures ranging from 990° C. to about 1400° C. in a controlled manner to obtain specific amounts of crystallinity and crystallite size, thereby increasing fiber performance in the form of a catalytic converter support mat. Such fibers will desirably have at least about 5 to about 50 percent crystallinity as detected by x-ray diffraction, and a crystallite size of from about 50 Å to about 500 Å. When such fibers are employed, the support mat provides a minimum pressure for holding the fragile catalyst support structure within the housing of at least one of i) at least 4 psi after at least 200 cycles and/or after 1000° C. of testing at 900° C. or ii) at least about 10 psi after at least 1000 cycles of testing at 750° C.

SUMMARY OF THE INVENTION

It is an object of the present invention to provide a device for the treatment of exhaust gases which includes a support element possessing improved holding pressure characteristics.

It is another object of the present invention to provide a device including a support element, as above, wherein the support element is formed from high index, melt-formed ceramic fibers of alumina and silica.

It is another object of the present invention to provide a device including a substantially nonexpanding ply of melt-formed ceramic fibers, as above, wherein the ply is a result of controlled mullite microcrystal formation in the melt-formed ceramic fiber via heat treatment under specific time-temperature regimens.

It is another object of the present invention to provide a device including a support element exhibiting a sufficient holding pressure of at least one of i) at least about 4 psi upon at least 200 cycles and/or at least 1000 cycles testing at a nominal temperature of 900° C. or ii) at least about 10 psi after at least 1000 cycles of testing at 750° C.

The foregoing objects, together with the advantages thereof over the known art relating to catalytic converters and other devices for the treatment of exhaust gases, which shall become apparent from the specification which follows, are accomplished by the invention as hereinafter described and claimed.

In general, the present invention provides a device for the treatment of exhaust gases comprising: a housing having an inlet at one end and an outlet at an opposite end through which exhaust gases flow; a fragile structure resiliently mounted within said housing, said fragile structure having an outer surface and an inlet end surface at one end in communication with said inlet of said housing and an outlet end surface at an opposite end in communication with said outlet end of said housing; a support element disposed between the housing and the fragile structure, said support element comprising an integral, substantially non-expanding ply of melt-formed ceramic fibers containing alumina and silica, said fibers having been prepared by a process including heat treating said fibers under a time-temperature regimen comprising heat treating said fibers at a temperature of 990° C. to at least 1050° C. for greater than 1 hour such that the treated fibers have about 5 to about 50 percent crystallinity as detected by x-ray diffraction, and a crystallite size of about 50 Å to about 500 Å; wherein said support element exerts a minimum residual pressure for holding said fragile structure within said housing of at least one of i) at least about 4 psi upon at least 200 cycles and/or at least 1000 cycles testing at a nominal temperature of 900° C. or ii) at least about 10 psi after at least 1000 cycles of testing at 750° C.

The present invention also provides a device for the treatment of exhaust gases comprising: a housing having an inlet at one end and an outlet at an opposite end through which exhaust gases flow; a fragile structure resiliently mounted within said housing, said fragile structure having an outer surface and an inlet end surface at one end in communication with said inlet of said housing and an outlet end surface at an opposite end in communication with said outlet end of said housing; a support element disposed between the housing and the fragile structure, said support element comprising an integral, substantially non-expanding ply of melt-formed ceramic fibers containing alumina and silica, said fibers having been prepared by a process of heat treating said fibers under a time-temperature regimen comprising heat treating said fibers at a temperature of greater than 1050° C. for an effective amount of time such that the treated fibers have about 5 to about 50 percent crystallinity as detected by x-ray diffraction, and a crystallite size of about 50 Å to about 500 Å; wherein said support element exerts a minimum residual pressure for holding said fragile structure within said housing of at least one of i) at least about 4 psi upon at least 200 cycles and/or at least 1000 cycles testing at a nominal temperature of 900° C. or ii) at least about 10 psi after at least 1000 cycles of testing at 750° C.

The present invention also provides a method for preparing a mat structure containing aluminosilicate fibers comprising providing melt-formed ceramic fibers containing alumina and silica, said fibers having an average diameter of from about 1 micron to about 14 microns, heat treating said fibers under a time-temperature regimen of one of (i) heat treating said fibers at a temperature of 990° C. to at least 1050° C. for greater than 1 hour such that the treated fibers have about 5 to about 50 percent crystallinity as detected by x-ray diffraction, and a crystallite size of about 50 Å to about 500 Å, and (ii) heat treating said fibers at a temperature of greater than 1050° C. for an effective time such that the treated fibers have about 5 to about 50 percent crystallinity as detected by x-ray diffraction, and a crystallite size of about 50 Å to about 500 Å, mixing said heat treated fibers with a binder to form a slurry, forming the slurry into a mat structure, and removing the binder.

The present invention further provides a method for mounting a fragile structure having at least one inlet surface within a device having a housing to provide thermal insulation and mechanical shock resistance to the fragile structure, the method comprising: providing a flexible support element comprising an integral, substantially non-expanding ply of melt-formed ceramic fibers containing alumina and silica, said fibers having an average diameter of from about 1 micron to about 14 microns, and having been heat treated under a time-temperature regimen of one of (i) heat treating said fibers at a temperature of 990° C. to at least 1050° C. for greater than 1 hour such that the treated fibers have about 5 to about 50 percent crystallinity as detected by x-ray diffraction, and a crystallite size of about 50 Å to about 500 Å, and (ii) heat treating said fibers at a temperature of greater than 1050° C. for an effective amount of time such that the treated fibers have about 5 to about 50 percent crystallinity as detected by x-ray diffraction, and a crystallite size of about 50 Å to about 500 Å, wrapping the flexible support element around the entire perimeter of at least a portion of the fragile structure's surfaces adjacent to the inlet face, forming a housing around the wrapped structure, and radially compressing said support element between said structure and said housing, wherein said support element exerts a minimum residual pressure for holding the fragile structure within the housing of at least one of i) at least about 4 psi upon at least 200 cycles and/or at least 1000 cycles testing at a nominal temperature of 900° C. or ii) at least about 10 psi after at least 1000 cycles of testing at 750° C.

DETAILED DESCRIPTION OF THE INVENTION

The present invention relates to devices having a fragile structure mounted within a housing which is supported therein by a support element disposed between the housing and the fragile structure. It will be understood that the present invention is not intended to be limited to use in the catalytic converter shown in the figures, and so the shape is shown only as an example to illustrate the invention. In fact, as noted hereinabove, the support element, or mounting mat as it is sometimes called, could be used to mount or support any fragile structure, such as a diesel particulate trap or the like. A diesel particulate trap include one or more porous tubular or honeycomb-like structures (having channels closed at one end, however), which are mounted by a thermally resistant material within a housing. Particulate is collected from exhaust gases in the porous structure until regenerated by a high temperature burnout process. Nonautomotive applications for the support mat of the present invention include but are not limited to catalytic converters for chemical industry emission (exhaust) stacks. The term "fragile structure" is intended to mean and include structures such as metal or ceramic monoliths or the like which may be fragile or frangible in nature and would benefit from a support element such as is described herein.

Figure 1:
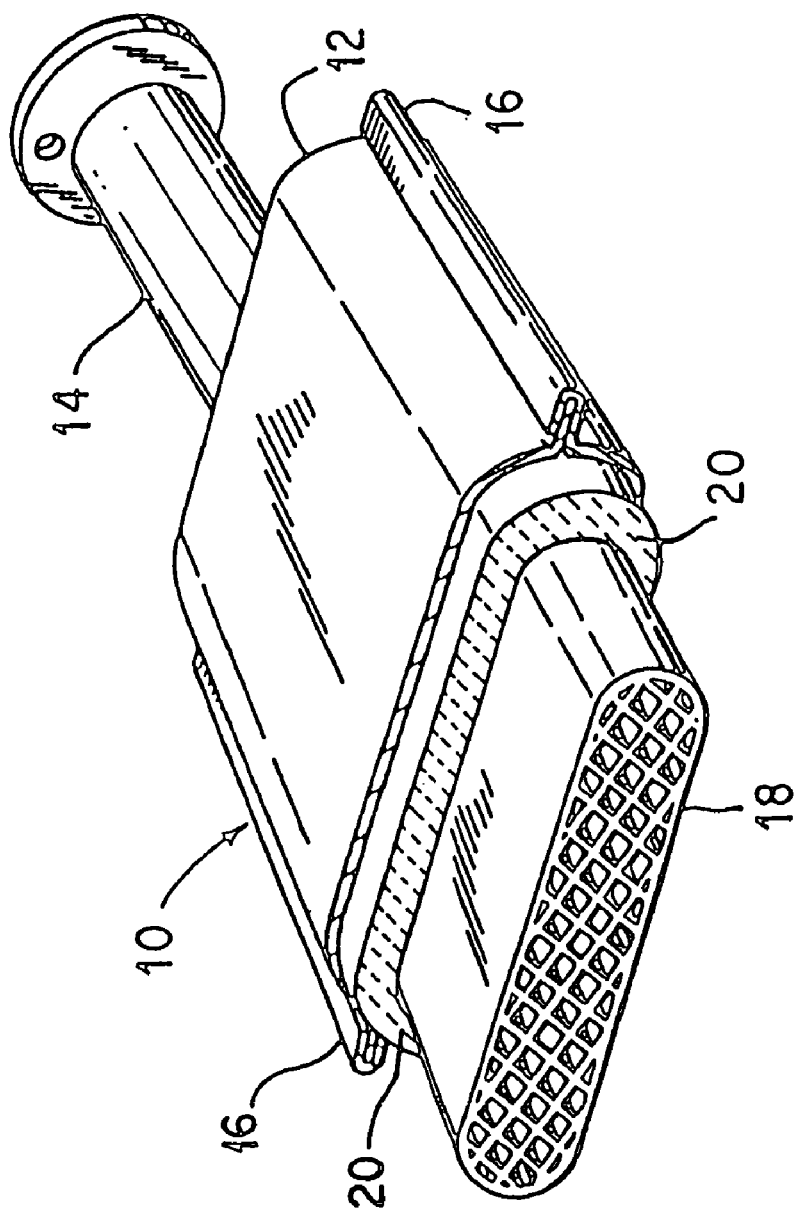
FIG. 1 is a fragmentary, elevational view of a catalytic converter according to the present invention.

One representative form of a device for treating exhaust gases is shown as a catalytic converter, generally designated by the numeral 10 in FIG. 1. Catalytic converter 10 includes a generally tubular housing 12 formed of two pieces of metal, e.g. high temperature-resistant steel. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18, which is supported and restrained within housing 12 by a support element such as mat 20, to be further described. Monolith 18 includes a plurality of gas-pervious passages which extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

In accordance with the present invention, the monolith is spaced from its housing by a distance or a gap, which will vary according to the type and design of the device, e.g., a catalytic converter or a diesel particulate trap, utilized. This gap is filled with a support element 20 to provide resilient support to the ceramic monolith 18. The resilient support element 20 provides both thermal insulation to the external environment and mechanical support to the catalyst support structure, protecting the fragile structure from mechanical shock. The support element 20 also possesses good handleability and is easily processed in the fabrication of devices utilizing its capabilities of maintaining a substantially stable and uniform minimum holding pressure of at least 4 psi after undergoing 200 or 1000 mechanical cycles at a nominal temperature of about 900° C. and, more preferably, of maintaining a holding pressure of at least 6 psi, and even more preferably, at least 10 psi, after undergoing 200 cycles. The support element 20 also possesses good handleability and is easily processed in the fabrication of devices utilizing its capabilities of maintaining a substantially stable and uniform minimum holding pressure of at least 10 psi after undergoing at least 1000 mechanical cycles at a nominal temperature of about 750° C.

By the term "cycle" it is meant that the gap between the monolith (i.e., fragile structure) and housing is opened and closed over a specific distance and at a predetermined rate. In order to simulate realistic conditions, the expansion of the gap between a housing and a fragile structure of 55 mm in diameter was determined by calculating the coefficient of thermal expansion of the conventional housing at a maximum temperature of 600° C. This calculation resulted in a gap expansion of 0.25 mm. Based upon this information, testing of the support element(s) was conducted by mounting a support element having a 2000 g/m² basis weight in an approximately 3.6 mm gap, thereby providing a compressed density of 0.55 g/cc at room temperature. The tested materials were then heat treated to 900° C. at a rate of about 20° C. per minute and held at that temperature throughout the test. The tested materials were then subjected to mechanical cycling, each "cycle" being defined over an approximately 28 second period of time wherein the 3.6 mm gap was opened 0.25 mm (10/1000th of an inch) and then closed 0.25 mm (10/1000th of an inch). After 200 or 1000 cycles, the residual minimum holding pressure exerted by the support element was then determined as described previously. While certain prior art support elements may also have the capability of maintaining a "high" minimum pressure after 200 or 1000 cycles, those elements uniformly contain very expensive, sol gel derived, refractory ceramic fibers having a high alumina content of at least 70 percent, and oftentimes, higher.

In contrast, the support element 20 of the present invention comprises an integral, substantially non-expanding composite sheet of melt-formed refractory ceramic fibers of alumina and silica, and a binder. By "integral" it is meant that, after manufacture, the mounting mat has a self-supporting structure, needing no reinforcing or containment layers of fabric, plastic or paper, (including those which are stitch-bonded to the mat) and can be handled or manipulated without disintegration. By "substantially non-expanding" is meant that the ply does not readily expand upon the application of heat as would be expected with intumescent mats. Of course, some expansion of the ply does occur based upon its thermal coefficient of expansion. The amount of expansion, however, is very insubstantial as compared to the expansion of intumescent mats. It will be appreciated that the mounting mat is substantially devoid of intumescent materials and sol gel-derived ceramic fibers.

As noted hereinabove, the ceramic fibers which are useful in the support element of the present invention are melt-formed ceramic fibers containing alumina and silica, and more preferably, melt spun refractory ceramic fibers. More particularly, these fibers have been heat treated at temperatures ranging from at least 990° C. to about 1400° C. such that the fibers exhibit suitable handling properties and resilience, have at least about 5 to about 50 percent crystallinity as detected by x-ray diffraction, and a crystallite size of from about 50 Å to about 500 Å. The preferred fibers are those selected from the group consisting of aluminosilicates, and more preferably, include those aluminosilicate fibers having from about 40 to about 60 percent alumina and from about 60 to about 40 percent silica, and more preferably, from about 47 to about 53 percent alumina and from about 47 to about 53 percent silica.

The fibers utilized in the plies of the present invention are melt-formed, preferably spun fibers of high purity chemically and preferably have an average diameter in the range of about 1 to about 14 μm, and more preferably, in the range of about 3 to 6.5 μm. The fibers are beneficiated as is well known in the art to obtain a greater than 90 percent fiber index, meaning they contain less than 10 percent shot, and preferably only about 5 percent shot.

It is important to note that the fibers of the present invention are further prepared by heat treating the fibers under one of two specific time-temperature regimens. The fibers should be heat treated at a temperature between 990° C. and 1400° C. Preferably, the ceramic fibers are heat treated under a time-temperature regimen of one of (i) heat treating said fibers at a temperature of 990° C. to at least 1050° C. for greater than 1 hour such that the fibers have about 5 to about 50 percent crystallinity as detected by x-ray diffraction, and a crystallite size of about 50 Å to about 500 Å, or (ii) heat treating said fibers at a temperature of greater than 1050° C. for an amount of time effective to develop, in the fibers, about 5 to about 50 percent crystallinity as detected by x-ray diffraction and a crystallite size of about 50 Å to about 500 Å.

In another embodiment, the fibers are heat treated at a temperature of 990° C. to at least 1100° C. for greater than 1 hour such that the fibers have about 5 to about 50 percent crystallinity as detected by x-ray diffraction, and a crystallite size of about 50 Å to about 500 Å. In one preferred embodiment, the process of heat treating said fibers involves heat treating the fibers at a temperature of about 1100° C. for an amount of time effective to develop, in the fibers, about 5 to about 50 percent crystallinity as detected by x-ray diffraction and a crystallite size of about 50 Å to about 500 Å.

In another preferred embodiment, the process of heat treating the fibers involves treating the fibers at a temperature of at least 1100° C. for at least two hours. It will be appreciated that the treatment time may be much longer, if desired, but improved fibers may or may not result from the longer heat treatment. For example, treatment of the fibers for an entire day is possible, or even for an entire a week. While it is believed that longer treatment times might provide even higher holding pressures, the 2 hour processing time has been deemed suitable for purposes of the present invention. In another embodiment, the particular melt processing technique requires heat treating the fibers at a temperature of at least 1100° C. for at least 30 minutes.

In another preferred embodiment, the process of heat treating the ceramic fibers involves treating the fibers at a temperature of 1200° C. for at least 10 minutes. Heat treating the fibers under this time-temperature regimen provides fibers having a minimum residual holding pressure of at least 15 psi. Longer heat treatment times at 1200° C., namely 30 minutes, provides a minimum residual holding pressure of about 20 psi. It will be appreciated that the treatment time may be much longer, if desired, but improved fibers may or may not result from the longer heat treatment.

If the fibers are heat treated at a temperature of only 990° C., they must undergo this treatment for a time period that is greater than one hour. Thus, contrary to the British Patent Specification No. 1,481,133, the fibers of the present invention are either heated at temperatures above the devitrification temperature, and more preferably, at least 100° C. above the devitrification temperature of the fibers, or are maintained at temperatures for a period of time well in excess of that suggested by the British patent reference. In any event, it has been found that such a treatment process provides melt-formed ceramic fibers suitable for the purposes of the present invention.

Once the fibers have been crystallized (heat treated) according to the parameters set forth above, they may then be formed into a mat or support element. In general, the support element is formed by providing a plurality of aluminosilicate fibers that have been heat treated according to the parameters set forth in the present invention. The heat treated fibers are mixed with a binder to form a mixture or slurry. The slurry of fibers and binder is then formed into a mat structure and the binder is removed, thereby forming a support element containing only the heat treated fibers. Typically a sacrificial binder is employed to initially bond the fibers together. The binders used in the present invention are typically organic binders. By "sacrificial" is meant that the binder will eventually be burned out of the mounting mat, leaving only the melt-formed ceramic fibers as the final support element.

Suitable binders include aqueous and nonaqueous binders, but preferably the binder utilized is a reactive, thermally setting latex, which after cure is a flexible material that can be burned out of the installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Preferably, about 5 to about 10 percent latex is employed, with about 8 percent being most preferred. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

The mounting mat or support element of the present invention can be prepared by any known techniques. For instance, using a papermaking process, ceramic fibers are mixed with a binder to form a mixture or slurry. Any mixing means may be used, but preferably the fibrous components are mixed at about a 0.25% to 5% consistency or solids content (0.25-5 parts solids to 99.75-95 parts water). The slurry may then be diluted with water to enhance formation, and it may finally be flocculated with flocculating agent and drainage retention aid chemicals. Then, the flocculated mixture or slurry may be placed onto a papermaking machine to be formed into a ply of ceramic paper. Alternatively, the plies may be formed by vacuum casting the slurry. In either case, they are typically dried in ovens. For a more detailed description of the standard papermaking techniques employed, see U.S. Pat. No. 3,458,329, the disclosure of which is incorporated herein by reference. This method typically breaks the fibers during processing. Accordingly the length of the fibers are generally about 0.025 cm to about 2.54 cm when this method is used.

Furthermore, the ceramic fibers may be processed into a mat or ply by conventional means such as dry air laying. The ply at this stage, has very little structural integrity and is very thick relative to the conventional catalytic converter and diesel trap mounting mats. The resultant mat can be dry needled, as is commonly known in the art, to densify the mat and increase its strength.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect the conventional papermaking technique. This method of preparing the mat aids in maintaining fiber length by reducing breakage. Generally the length of the fibers are about 1 cm to about 10 cm, preferably about 1.25 cm to about 7.75 cm when this method is used.

Methods of impregnation of the mat with the binder include complete submersion of the mat in a liquid binder system, or alternatively spraying the mat. In a continuous procedure, a ceramic fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

Regardless of which of the above-described techniques are employed, the composite can be cut, such as by die stamping, to form mounting mats of exact shapes and sizes with reproducible tolerances. This mounting mat 20 exhibits suitable handling properties, meaning it can be easily handled and is not so brittle as to crumble in one's hand like many other blankets or mats. It can be easily and flexibly fitted around the catalyst support structure 18 without cracking and fabricated into the catalytic converter housing 12 to form a resilient support for the catalyst support structure 18, with minimal or no flashing such as by extrusion or flow of excess material into the flange area 16 and provides a holding pressure against the catalyst support structure 18 of at least one of i) at least 4 psi after at least 200 cycles or at least 1000 cycles of gap expansion testing at a nominal temperature of 900° C. or ii) at least 10 psi after at least 1000 cycles of gap expansion testing at a nominal temperature of 750° C. More preferably, the ply provides a minimum residual holding pressure against the catalyst support structure 18 of at least 10 psi at a nominal temperature of 900° C. after 200 cycles, or at least 6 psi, and even more preferably, at least 12 psi, at 900° C. after 1000 cycles.

It will be appreciated that other fibers, such as E-glass, might also be added to the mounting mat composition in small quantities of 2 percent or less. Although studied have not been completed, it is believed that the E-glass has no benefit to the mat of the present invention, and may even cause it to degrade over a period of time.

In operation, the catalytic converter experiences a significant change in temperature. Due to the differences in their thermal expansion coefficients, the housing 12 may expand more than the support structure 18, such that the gap between these elements will increase slightly. In a typical case, the gap may expand and contract on the order of 0.25 mm during thermal cycling of the converter. The thickness and mounting density of the mounting mat is selected such that a minimum holding pressure of at least 4 psi is maintained under all conditions to prevent the fragile structure from vibrating loose. The substantially stable mounting pressure exerted by the mounting mat 20 under these conditions permits accommodation of the thermal characteristics of the assembly without compromising the physical integrity of the constituent elements.

Having described the invention in general terms, it is now illustrated in greater detail by way of examples. It will be understood that these examples are for illustration only and should not be considered limiting in any respect, unless otherwise stated. These examples are used to demonstrate practice of the invention only.

Initially, melt-formed ceramic fibers of high purity chemistry comprising from about 47 percent to about 53 percent alumina and from about 47 percent to about 53 percent silica were prepared. The fibers had a mean diameter in the range of from about 5.4 μm to about 6.2 μm. The fibers were washed in a conventional manner to obtain a greater than 90 percent fiber index and thereafter were heat treated at a temperature between at least 990° C. and about 1400° C. More particularly, most of these examples were heat treated at a temperature between about 1100° C. and 1150° C. The particular heat treatment schedule involved a 1 hour ramp time and a 2 hour soak time at the target temperature about between 1100° C. and 1150° C. The heat treated fibers were then incorporated into mat form via a conventional papermaking process using about 8 percent latex binder. In some instances, up to about 2 percent E-glass may also have been added to the ply of fibers, but these E-glass fibers are not believed to have affected the essential nature of the invention.

In order to demonstrate practice of the invention, ten sample mats, prepared according to the concepts of the present invention (Examples 1-10), and comprising fibers as shown in Table I, were prepared, and tested to determine their minimum residual holding pressure. The mats had a 2000 g/m$^2$ basis weight and were mounted in a 3.6 mm gap, giving a compressed density of about 0.55 g/cc at room temperature. The mats were then heated to either 750° C. or 900° C. and the temperature remained there for the duration of the test. The gap was then opened $^{10}/_{1000}$ths of an inch (0.25 mm) and then closed $^{10}/_{1000}$ths of an inch (0.25 mm) over the course of about 28 seconds, to delineate one cycle. The mats were tested at a constant temperature of about 750° C. for 1000 cycles, or a constant temperature of about 900° C. for 200 and 1000 cycles, respectively. The minimum resulting holding pressure for each mat was recorded and is set forth in Table I. The results of these tests were then compared to the results of the same tests with respect to competitive mats prepared from 100% mullite sol-gel fiber (Example A) and from a mixture of about 75 percent sol gel ceramic fiber and about 25 percent amorphous aluminosilicate fiber (Example B). Other mats were prepared based upon the disclosure of British Patent Specification No. 1,481,133, including a high purity, melt-blown, small diameter aluminosilicate fiber (Example C) and a larger diameter, Kaolin-based fiber (Example D). The comparison is shown in Table I.

TABLE I

Sample Fiber Compositions and Resultant P min (at 900° C.) after 200 and 1000 Cycles, and P min (at 750° C.) after 1000 Cycles

| Example No. | Fiber Description | Target Temp. (° C.) | Time | P min at 200 cycles at 900° C. (psi) | P min at 1000 cycles at 900° C. (psi) | P min at 1000 cycles at 750° C. (psi) |
|---|---|---|---|---|---|---|
| 1 | 98% melt spun large diameter aluminosilicate fiber; 2% E-glass | 1300° C. | 2 hour | 13.13 | 9.22 | — |
| 2 | 98% melt spun small diameter aluminosilicate fiber; 2% E-glass | 1100° C. | 2 hour | — | 6.81 | — |
| 3 | 98% melt spun large diameter aluminosilicate fiber; 2% E-glass | 1100° C. | 2 hour | 19.03 | 10.0 | — |
| A | 100% sol-gel mullite fiber | — | — | 16.24 | 12.46 | — |
| B | 75% sol-gel fiber; 25% amphorous aluminosilicate fiber | — | — | 3.59 | 1.55 | — |
| C | 100% melt blown small diameter aluminosilicate fiber | 1050° C. | 30 min | 0.88 | — | — |
| D | 100% Kaolin-based fiber | 1050° C. | 1 hour | 0.86 | — | — |
| 4 | 100% melt spun large diameter aluminosilicate fiber | 1100° C. | 2 hours | 14.37 | 8.16 | — |
| 5 | 100% melt spun large diameter aluminosilicate fiber | 1200° C. | 2 hours | 18.22 | 10.26 | — |

TABLE I-continued

Sample Fiber Compositions and Resultant P min (at 900° C.) after 200 and 1000 Cycles, and P min (at 750° C.) after 1000 Cycles

| Example No. | Fiber Description | Target Temp. (° C.) | Time | P min at 200 cycles at 900° C. (psi) | P min at 1000 cycles at 900° C. (psi) | P min at 1000 cycles at 750° C. (psi) |
|---|---|---|---|---|---|---|
| 6 | 100% melt spun large diameter aluminosilicate fiber | 1200° C. | 10 min | — | — | 15 |
| 7 | 100% melt spun large diameter aluminosilicate fiber | 1200° C. | 13 min | — | — | 18.4 |
| 8 | 100% melt spun large diameter aluminosilicate fiber | 1200° C. | 18 min | — | — | 17.8 |
| 9 | 100% melt spun large diameter aluminosilicate fiber | 1200° C. | 30 min | — | — | 20.4 |
| 10 | 100% melt spun large diameter aluminosilicate fiber | 1200° C. | 60 min | — | — | 21.2 |

The term "large diameter" refers to aluminosilicate fibers having an average diameter of about 3 to about 6.5 microns. The term "small diameter" refers to aluminosilicate fibers having an average diameter of about 1 to about 2 microns. Important comparisons to be made from the Table I are with respect to the data showing the performance of the ceramic fiber mats for the minimum holding pressure or load ($P_{min}$) after the 200th and 1000th cycle in the test. It will be appreciated that while the very expensive 100% mullite fiber showed the best results of about 12.46 psi after 1000 cycles, the minimum pressures exerted by all of the mats of the present invention were above at least 6 psi, after 1000 cycles. Moreover, of the mats of the present invention which where tested after 200 cycles, each mat maintained a minimum pressure of at least 13 psi at 900° C.

Figure 2:
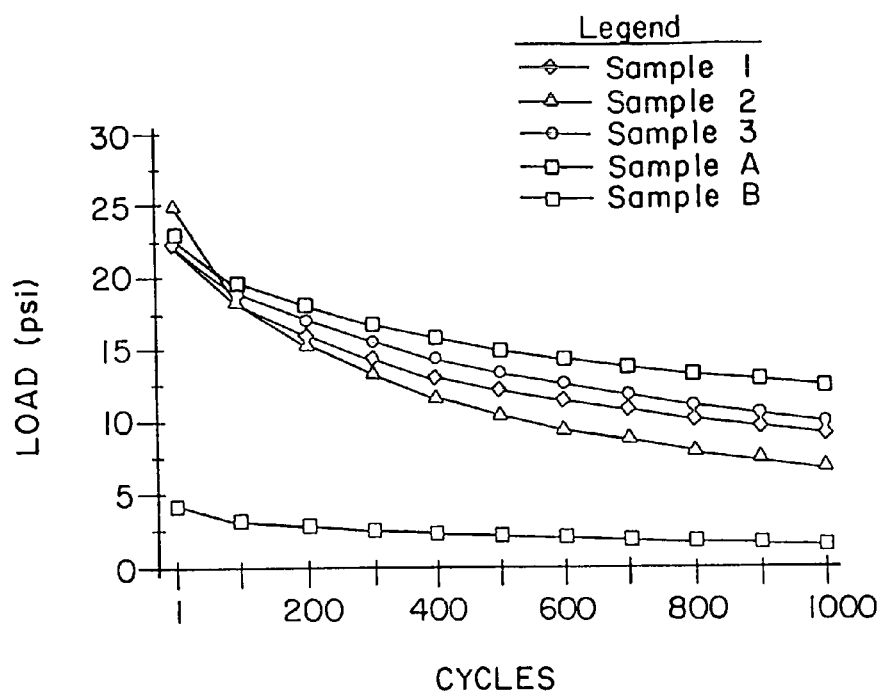
FIG. 2 is a graphical representation of the minimum pressure exerted (i.e., load) in comparison to the number of cycles tested (i.e., up to 1000) for a number of support elements prepared in accordance with the present invention and compared to other mats and blankets of the prior art.
Figure 3:
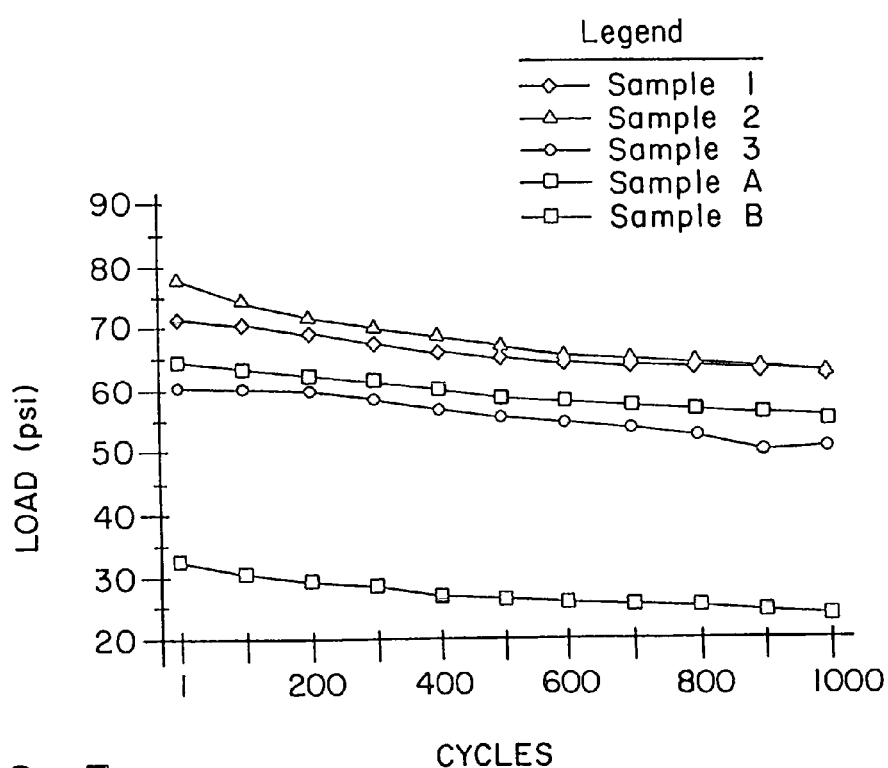
FIG. 3 is a graphical representation of the maximum pressure exerted (i.e., load) in comparison to the number of cycles tested (i.e., up to 1000) for each of the support elements set forth in FIG. 2.

With respect to further data, FIGS. 2 and 3 show various data points, which show a recognizable and predictable pattern for the minimum and maximum pressures over the complete 1000 cycles of the compression test at 900° C. The fact that the tested mats exhibit predictable behavior with respect to degradation due to high temperature exposure and mechanical cycling makes them further useful.

Figure 4:
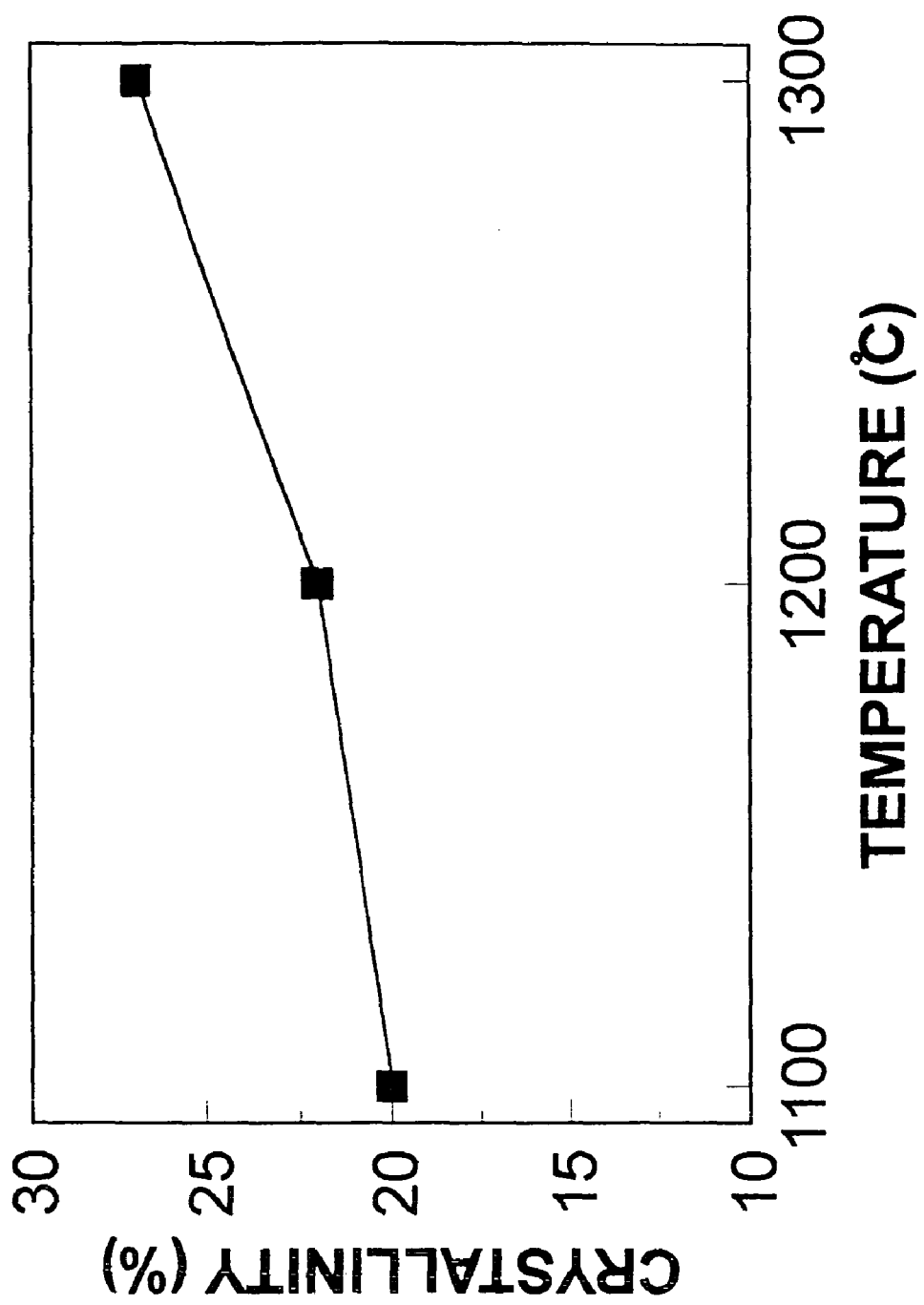
FIG. 4 is a graphical representation of the percent mullite crystallinity of the ceramic fiber of the present invention as a function of the heat treatment temperature.
Figure 5:
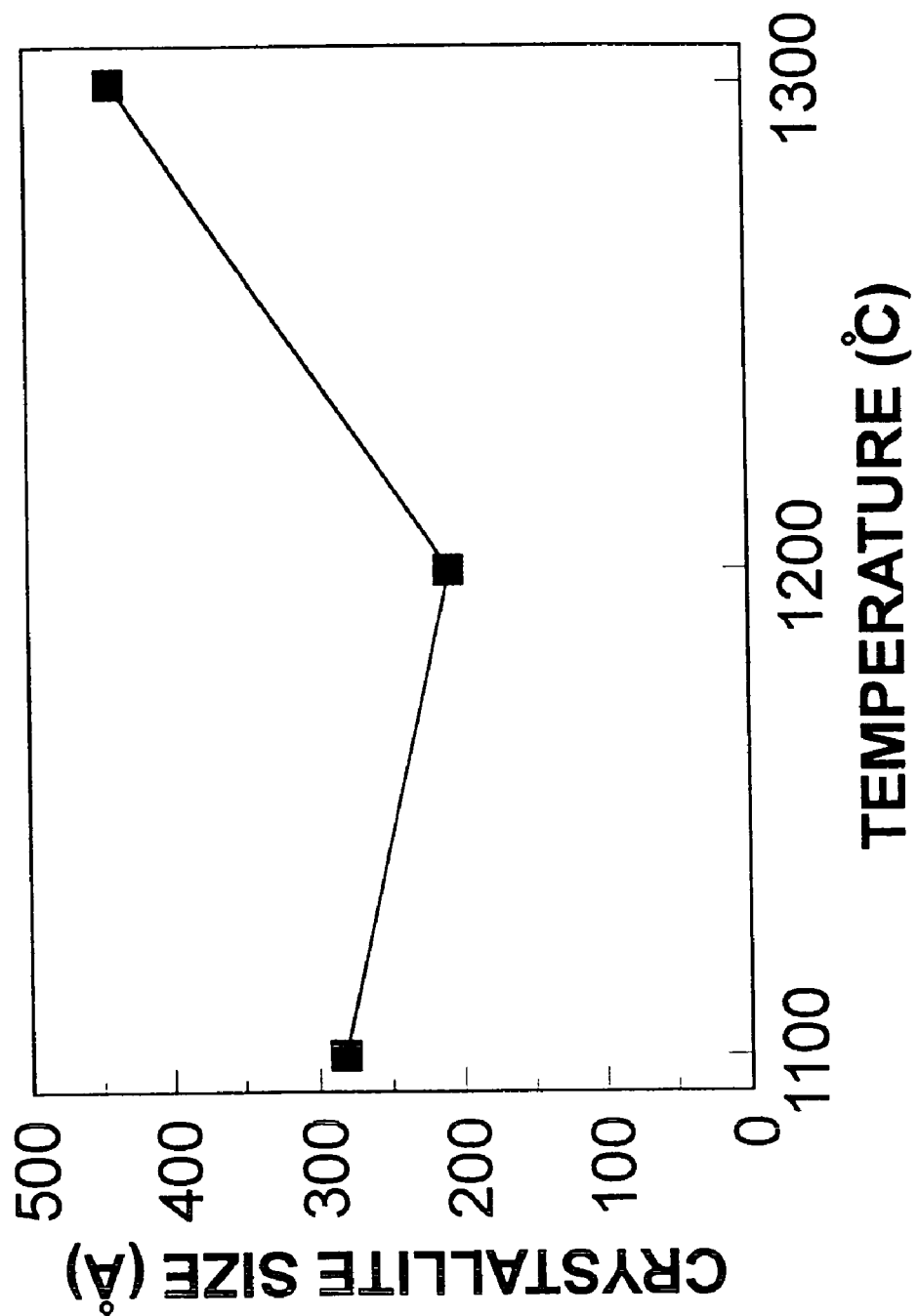
FIG. 5 is a graphical representation of the crystallite size of the ceramic fiber of the present invention as a function of the heat treatment temperature.

FIGS. 4 and 5 illustrate the percent crystallinity and crystallite size data for the fiber used in the present invention. Based upon this data, the present invention specifies a percent crystallinity of between about 5 percent and about 50 percent by weight, while crystallite size ranges from about 50 Å to about 500 Å. From the data in FIG. 5, it will be appreciated that fibers having a crystallite size larger than 200 Å does not hinder the present invention, contrary to the statements found in the British Patent Specification No. 1,481,133. In fact, it will be appreciated that larger or smaller size crystallite size may or may not be useful to the present invention.

Figure 6:
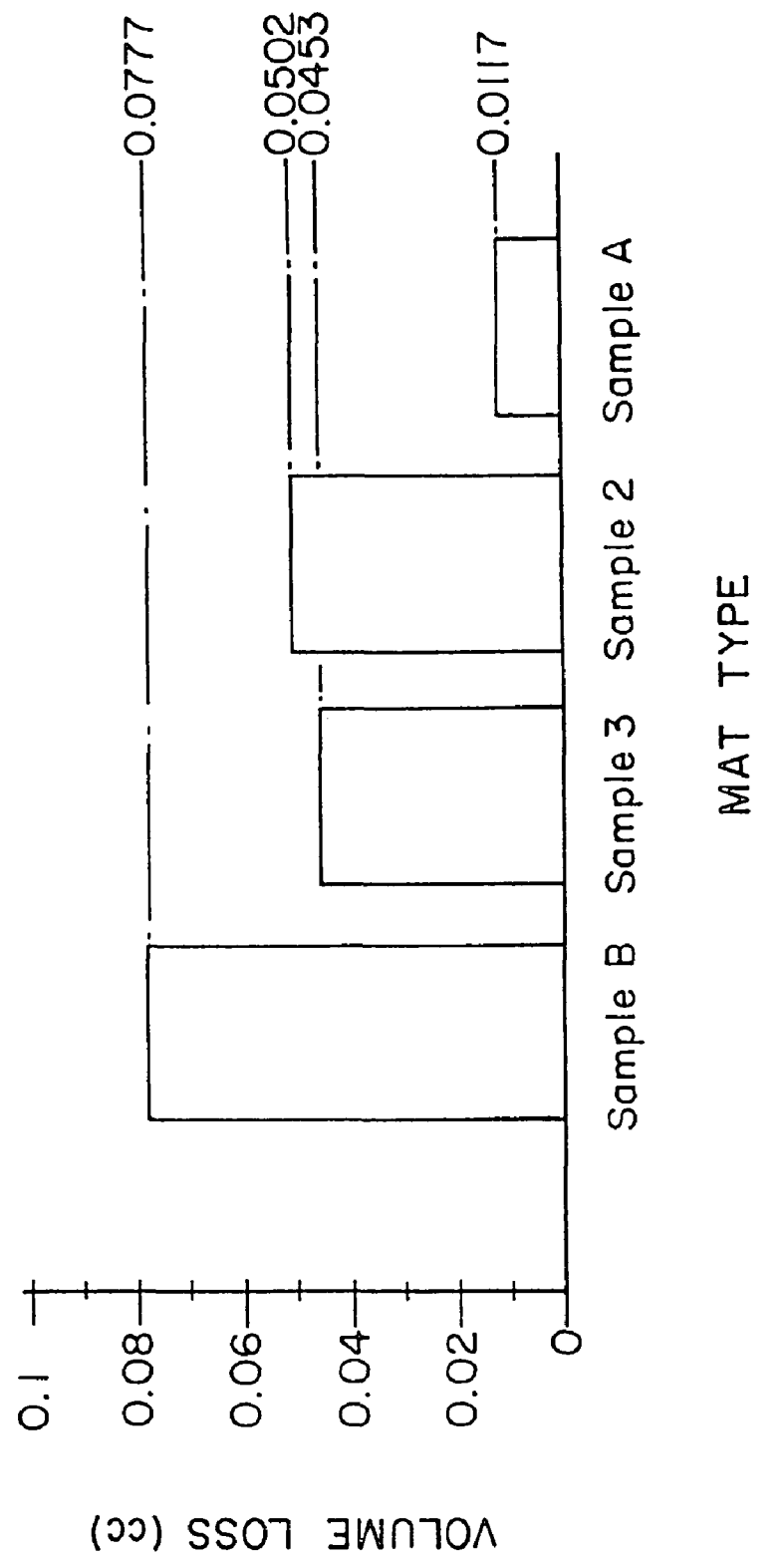
FIG. 6 is a bar graph comparison of the volume loss (in cc) of support elements containing one of four tested fibers of the present invention or the prior art.

FIG. 6 illustrates the comparative durability performance of the mats. It should be noted that the volume loss in all of the samples tested is relatively negligible and that the seemingly large difference between the results is basically insignificant. Any product with less than 0.3 cc volume loss would be considered to have adequate durability.

Figure 7:
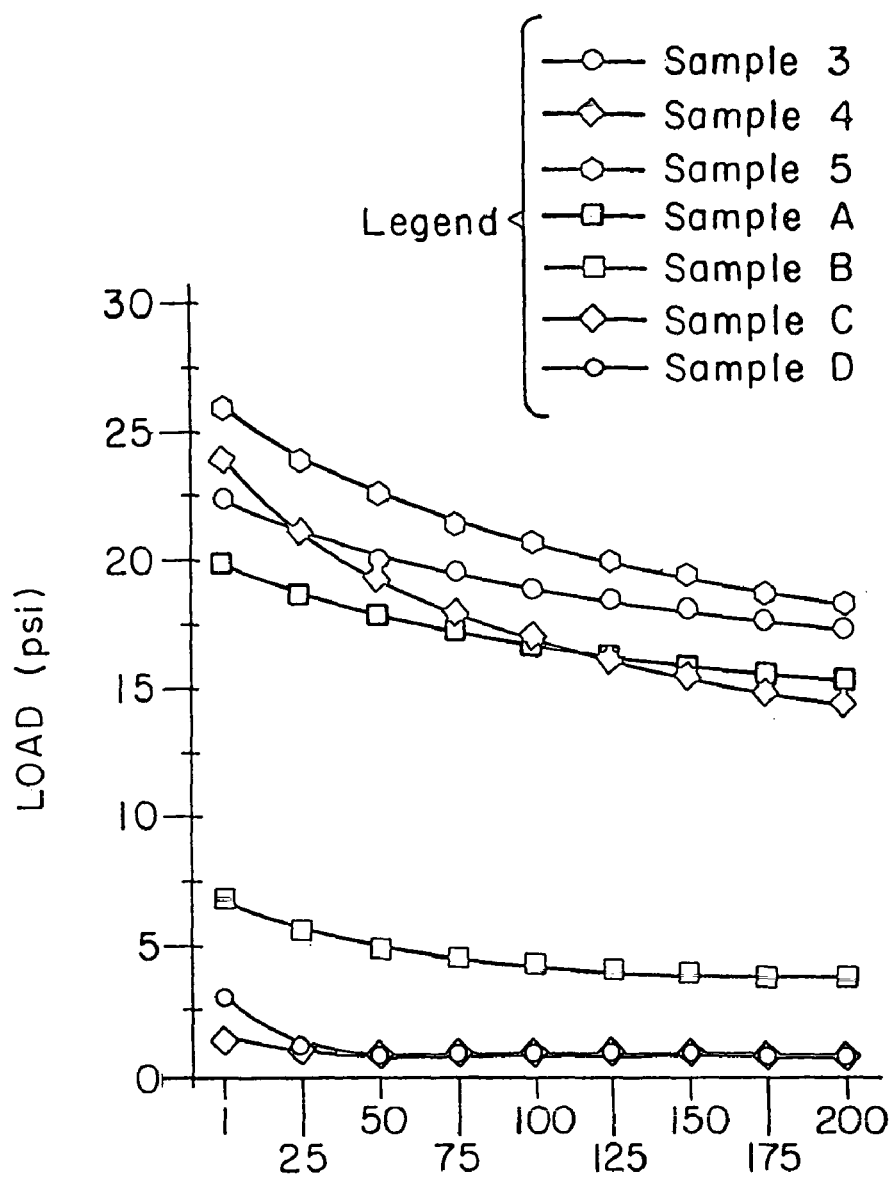
FIG. 7 is a graphical representation of the minimum pressure exerted (i.e., load) in comparison to the number of cycles tested (i.e., up to 200) for a number of support elements prepared in accordance with the present invention and compared to other mats and blankets of the prior art.

FIG. 7 illustrates the recognizable and predictable pattern for the minimum holding pressures over 200 cycles of the compression test at 900° C. for other samples of material. In particular, Samples 4 and 5 contain melt-spun, large diameter fibers of aluminosilicate. The samples were heated to 1100° C. and 1200° C., respectively, for 2 hours. In contrast, it will be appreciated that Sample C contains high purity, high index aluminosilicate fibers having average diameters of between about 1.5 and 2.5 microns. This sample was heat treated to 1050° C. for 30 minutes as set forth in the British Patent Specification No. 1,481,133. Similarly, Sample D used Kaolin-based, high index fibers having an average diameter of about 3 microns. That sample was heat treated to 1050° C. for 1 hour, and still did not maintain a residual minimum pressure upon testing at 900° C. after 200 cycles of at least 4 psi. The samples of the present invention, on the other hand, were consistently above 4 psi.

Figure 8:
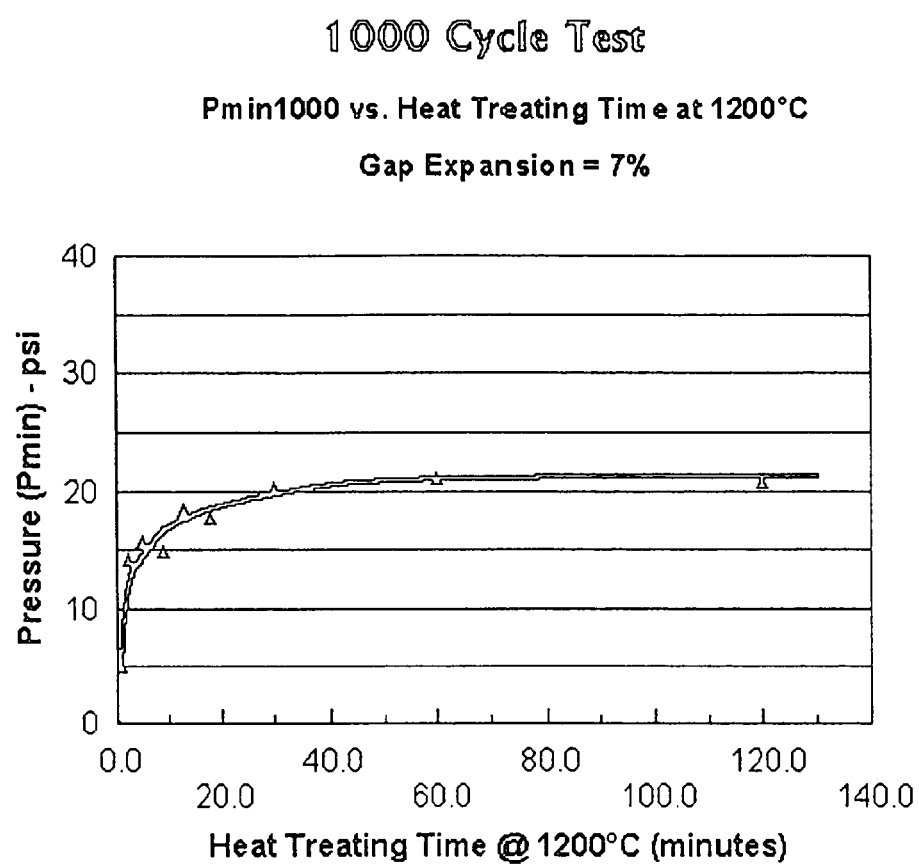
FIG. 8 is a graphical representation of the minimum holding pressure ($P_{min}$, in psi) of a representative support element prepared according to the methods of the present invention as a function of the heat treating of the ceramic fibers.

FIG. 8 illustrates that the process of heat treating the aluminosilicate ceramic fibers, according to the present invention, for 10 minutes at 1200° C. provides fibers having a minimum residual holding pressure of about 15 psi after 1000 cycles of compression testing at 750° C. The process of heat treating the aluminosilicate ceramic fibers, according to the present invention, for about 30 minutes at 1200° C. provides fibers having a minimum holding residual pressure of about 20 psi after 1000 cycles of compression testing at 750° C.

Figure 9:
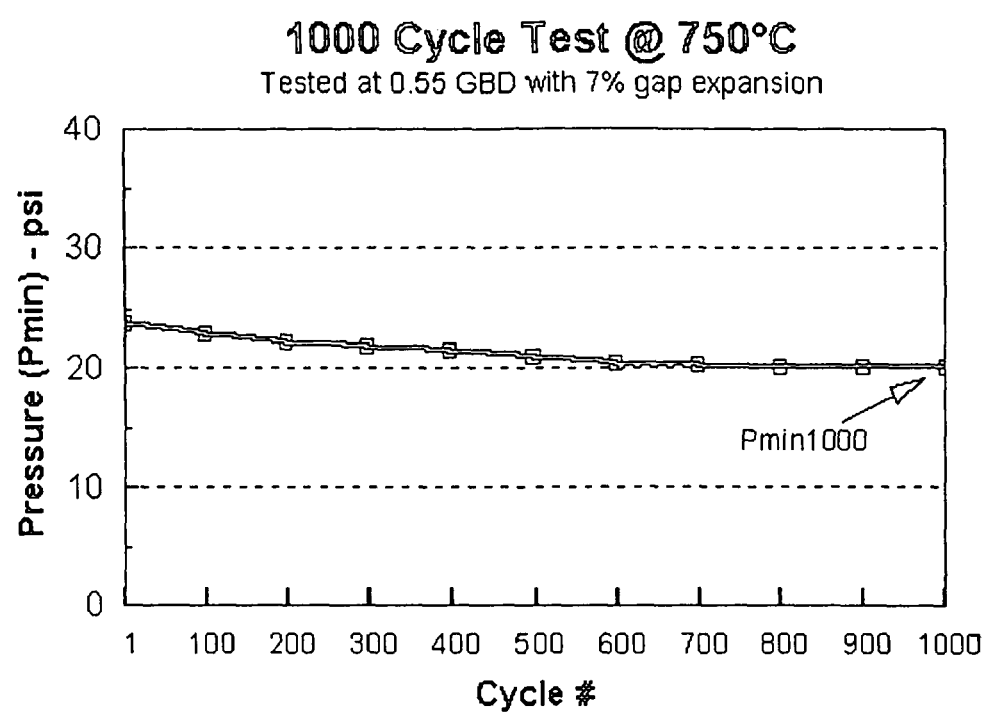
FIG. 9 is a graphical representation of the minimum holding pressure ($P_{min}$, in psi) of a representative support element prepared according to the methods of the present invention after testing of 1000 mechanical cycles at 750° C.

Aluminosilicate ceramic fibers were heat treated under a time-temperature regimen of 60 minutes at 1200° C. The heat treated fibers were formed into sample mats and tested for retention of minimum holding pressure after 1000 cycles at 750° C. FIG. 9 shows that ceramic fibers that were heat treated for about 1 hour at 1200° C. maintained a minimum residual holding pressure ($P_{min}$) at least 20 psi upon testing at 750° C. after 1000 cycles.

In light of the excellent physical property characteristics demonstrated by the mounting mats/support elements of the present invention, these mats are believed desirable to at least the catalytic converter and diesel trap designers and manufacturers. The mounting mats can be die cut and are operable as resilient supports in a thin profile, providing ease of handling, and in a flexible form, so as to be able to provide a total wrap of the catalyst support structure without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The present invention is useful in a variety of applications such as catalytic converters for, inter alia, motorcycles and other small engine machines, and automotive preconverters, as well as high temperature spacers, gaskets, and even future generation automotive underbody catalytic converter systems. Generally, the present invention can be used in any application requiring a mat or gasket to exert holding pressure at room temperature and, more importantly, to provide the ability to maintain the holding pressure at elevated temperatures of from about 20° C. to about 1300° C., including during thermal cycling.

The mounting mat of the present invention can also be used in catalytic converters employed in the chemical industry which are located within exhaust or emission stacks, and which also contain fragile honeycomb type structures that need to be protectively mounted.

Thus, the objects of the invention are accomplished by the present invention, which is not limited to the specific embodiments described above, but which includes variations, modifications and equivalent embodiments defined by the following claims.

We claim:

1. A device for the treatment of automotive exhaust gases comprising:
    a housing having an inlet at one end and an outlet at an opposite end through which exhaust gases flow;
    a fragile structure resiliently mounted within said housing, said fragile structure having an outer surface and an inlet end surface at one end in communication with said inlet of said housing and an outlet end surface at an opposite end in communication with said outlet end of said housing;
    a support element disposed between the housing and the fragile structure, said support element comprising an integral, substantially non-expanding ply of melt-formed ceramic fibers comprising about 40 weight percent to about 60 weight percent alumina and about 60 weight percent to about 40 weight percent silica, and a sacrificial binder, wherein said fibers having been prepared by a process including heat treating said fibers under a time-temperature regimen comprising heat treating said fibers at a temperature of 990° C. to at least 1050° C. for greater than 1 hour such that the treated fibers have about 5 to about 50 percent crystallinity as detected by x-ray diffraction, and a crystallite size of greater than 200 Å to about 500 Å; and
    wherein said support element exerts a minimum residual pressure for holding said fragile structure within said housing of one of at least 4 psi after 200 cycles of testing at 900° C. or at least 10 psi after 1000 cycles of testing at 750° C.

2. The exhaust gas treatment device of claim 1, wherein the fragile structure has a perimeter, at least a portion of which is integrally wrapped by the support element.

3. The exhaust gas treatment device of claim 1, wherein the fibers have average diameters ranging from about 1 microns to about 14 microns.

4. The exhaust gas treatment device of claim 3, wherein the fibers have average diameters ranging from about 3 microns to about 6.5 microns.

5. The exhaust gas treatment device of claim 1, wherein the fibers have less than about 10% shot.

6. The exhaust gas treatment device of claim 1, wherein the support element provides a minimum residual pressure for holding the fragile structure within the housing after 200 cycles of testing at 900° C. of at least 10 psi.

7. The exhaust gas treatment device of claim 1, wherein the support element is prepared by the process comprising melt spinning the fibers; heat treating the fibers; and incorporating the fibers into mat form.

8. The exhaust gas treatment device of claim 1, wherein said exhaust gas treatment device is a catalytic converter.

9. The exhaust gas treatment device of claim 1, wherein said exhaust gas treatment device is a diesel particulate trap.

10. A device for the treatment of automotive exhaust gases comprising:
    a housing having an inlet at one end and an outlet at an opposite end through which exhaust gases flow;
    a fragile structure resiliently mounted within said housing, said fragile structure having an outer surface and an inlet end surface at one end in communication with said inlet of said housing and an outlet end surface at an opposite end in communication with said outlet end of said housing;
    a support element disposed between the housing and the fragile structure, said support element comprising an integral, substantially non-expanding ply of melt-formed ceramic fibers comprising about 40 weight percent to about 60 weight percent alumina and about 60 weight percent to about 40 weight percent silica, and a sacrificial binder, wherein said fibers having been prepared by a process of heat treating said fibers under a time-temperature regimen comprising heat treating said fibers at a temperature of greater than 1050° C. for an effective amount of time such that the treated fibers have about 5 to about 50 percent crystallinity as detected by x-ray diffraction, and a crystallite size of greater than 200 Å to about 500 Å;
    wherein said support element exerts a minimum residual pressure for holding said fragile structure within said housing of one of at least 4 psi after 200 cycles of testing at 900° C. or at least 10 psi after 1000 cycles of testing at 750° C.

11. The exhaust gas treatment device of claim 10, wherein the fragile structure has a perimeter, at least a portion of which is integrally wrapped by the support element.

12. The exhaust gas treatment device of claim 10, wherein the fibers have average diameters ranging from about 1 microns to about 14 microns.

13. The exhaust gas treatment device of claim 12, wherein the fibers have average diameters ranging from about 3 microns to about 6.5 microns.

14. The exhaust gas treatment device of claim 10, wherein the fibers have less than about 10% shot.

15. The exhaust gas treatment device of claim 10, wherein the support element provides a minimum residual pressure for holding the fragile structure within the housing after 200 cycles of testing at 900° C. of at least 10 psi.

16. The exhaust gas treatment device of claim 10, wherein the support element provides a minimum residual pressure for holding the fragile structure within the housing after 1000 cycles of testing at 750° C. of at least 10 psi.

17. The exhaust gas treatment device of claim 10, wherein the support element is prepared by the process comprising melt spinning the fibers; heat treating the fibers; and incorporating the fibers into mat form.

18. The exhaust gas treatment device of claim 10, wherein the fibers are heat treated under a time-temperature regimen of heat treating at a temperature between 1100° C. and about 1400° C. for at least 1 hour.

19. The exhaust gas treatment device of claim 10, wherein the fibers are heat treated under a time-temperature regimen of heat treating at a temperature of at least 1100° C. for at least 2 hours.

20. The exhaust gas treatment device of claim 10, wherein the fibers are heat treated under a time-temperature regimen of heat treating at a temperature of at least 1200° C. for at least 10 minutes.

21. The exhaust gas treatment device of claim 18, wherein the support element provides a minimum residual pressure for holding the fragile structure within the housing after 1000 cycles of testing at 750° C. of at least 20 psi.

22. The exhaust gas treatment device of claim 10, wherein said exhaust gas treatment device is a catalytic converter.

23. The exhaust gas treatment device of claim 10, wherein said exhaust gas treatment device is a diesel particulate trap.

24. The exhaust gas treatment device of claim 1, wherein said support element is needled.

25. The exhaust gas treatment device of claim 7, wherein said mat is needled.

26. The exhaust gas treatment device of claim 10, wherein said support element is needled.

27. The exhaust gas treatment device of claim 17, wherein said mat is needled.

28. A device for the treatment of automotive exhaust gases comprising:
 a housing having an inlet at one end and an outlet at an opposite end through which exhaust gases flow;
 a fragile structure resiliently mounted within said housing, said fragile structure having an outer surface and an inlet end surface at one end in communication with said inlet of said housing and an outlet end surface at an opposite end in communication with said outlet end of said housing;
 a support element disposed between the housing and the fragile structure, said support element comprising an integral, substantially non-expanding ply of melt-formed ceramic fibers comprising about 40 weight percent to about 60 weight percent alumina and about 60 weight percent to about 40 weight percent silica, and a sacrificial binder, wherein said fibers having about 5 to about 50 percent crystallinity as detected by x-ray diffraction, and a crystallite size of greater than 200 Å to about 500 Å; and
 wherein said support element exerts a minimum residual pressure for holding said fragile structure within said housing of one of at least 4 psi after 200 cycles of testing at 900° C. or at least 10 psi after 1000 cycles of testing at 750° C.

29. The exhaust gas treatment device of claim 28, wherein the fragile structure has a perimeter, at least a portion of which is integrally wrapped by the support element.

30. The exhaust gas treatment device of claim 28, wherein the fibers have average diameters ranging from about 1 microns to about 14 microns.

31. The exhaust gas treatment device of claim 30, wherein the fibers have average diameters ranging from about 3 microns to about 6.5 microns.

32. The exhaust gas treatment device of claim 28, wherein the fibers have less than about 10% shot.

33. The exhaust gas treatment device of claim 28, wherein the support element provides a minimum residual pressure for holding the fragile structure within the housing after 200 cycles of testing at 900° C. of at least 10 psi.

34. The exhaust gas treatment device of claim 28, wherein the support element is prepared by the process comprising melt spinning the fibers; heat treating the fibers; and incorporating the fibers into mat form.

35. The exhaust gas treatment device of claim 28, wherein said exhaust gas treatment device is a catalytic converter.

36. The exhaust gas treatment device of claim 28, wherein said exhaust gas treatment device is a diesel particulate trap.

37. The exhaust gas treatment device of claim 28, wherein the support element provides a minimum residual pressure for holding the fragile structure within the housing after 1000 cycles of testing at 750° C. of at least 10 psi.

38. The exhaust gas treatment device of claim 28, wherein the support element provides a minimum residual pressure for holding the fragile structure within the housing after 1000 cycles of testing at 750° C. of at least 20 psi.

* * * * *